United States Patent
Seo et al.

(10) Patent No.: US 9,769,815 B2
(45) Date of Patent: Sep. 19, 2017

(54) METHOD AND APPARATUS FOR RECEIVING DOWNLINK SIGNAL IN WIRELESS COMMUNICATION SYSTEM

(71) Applicant: LG ELECTRONICS INC., Seoul (KR)

(72) Inventors: Inkwon Seo, Seoul (KR); Hanbyul Seo, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 119 days.

(21) Appl. No.: 14/765,299

(22) PCT Filed: Jan. 29, 2014

(86) PCT No.: PCT/KR2014/000874
§ 371 (c)(1),
(2) Date: Jul. 31, 2015

(87) PCT Pub. No.: WO2014/119939
PCT Pub. Date: Aug. 7, 2014

(65) Prior Publication Data
US 2015/0373677 A1  Dec. 24, 2015

Related U.S. Application Data

(60) Provisional application No. 61/759,418, filed on Feb. 1, 2013, provisional application No. 61/761,218, filed (Continued)

(51) Int. Cl.
*H04W 72/04* (2009.01)
*H04W 8/26* (2009.01)
*H04L 5/00* (2006.01)

(52) U.S. Cl.
CPC ......... *H04W 72/042* (2013.01); *H04L 5/0051* (2013.01); *H04L 5/0053* (2013.01);
(Continued)

(58) Field of Classification Search
CPC ........... H04W 72/042; H04W 72/0446; H04W 72/0413; H04L 5/001; H04L 5/0053
See application file for complete search history.

(56) References Cited

U.S. PATENT DOCUMENTS

2010/0215011 A1* 8/2010 Pan ..................... H04L 5/0064
370/329
2010/0248765 A1* 9/2010 Chun ................ H04W 72/042
455/509

(Continued)

FOREIGN PATENT DOCUMENTS

KR   10-2010-0071665 A    6/2010
KR   10-2012-0115947 A   10/2012

(Continued)

*Primary Examiner* — Jung Park
(74) *Attorney, Agent, or Firm* — Birch, Stewart, Kolasch & Birch, LLP

(57) ABSTRACT

According to an embodiment of the present invention, a method of receiving a downlink signal by a user equipment (UE) in a wireless communication system includes the steps of: receiving information indicating usage change of a first sub-frame, which is a special sub-frame, into a downlink sub-frame; and decoding a control channel from the usage-changed sub-frame, using a first radio network temporary identifier (RNTI) and a second RNTI, wherein the UE assumes that data exists in a DwPTS area from among resource areas indicated by the control channel when the decoding using the first RNTI is successful.

13 Claims, 9 Drawing Sheets

Related U.S. Application Data on Feb. 5, 2013, provisional application No. 61/818,900, filed on May 2, 2013, provisional application No. 61/821,680, filed on May 9, 2013.

(52) U.S. Cl.
CPC .......... *H04W 8/26* (2013.01); *H04W 72/044* (2013.01); *H04L 5/0007* (2013.01)

(56) References Cited

U.S. PATENT DOCUMENTS

| | | | |
|---|---|---|---|
| 2010/0279628 A1* | 11/2010 | Love | H04L 5/0091 455/70 |
| 2012/0182896 A1 | 7/2012 | Jang et al. | |
| 2013/0336300 A1 | 12/2013 | Choi et al. | |
| 2014/0086112 A1* | 3/2014 | Stern-Berkowitz | H04W 72/1289 370/280 |
| 2014/0086119 A1 | 3/2014 | Yang et al. | |

FOREIGN PATENT DOCUMENTS

| | | |
|---|---|---|
| KR | 10-2012-0132911 A | 12/2012 |
| WO | WO 2012/119309 A1 | 9/2012 |
| WO | WO 2013/002591 A2 | 1/2013 |

\* cited by examiner

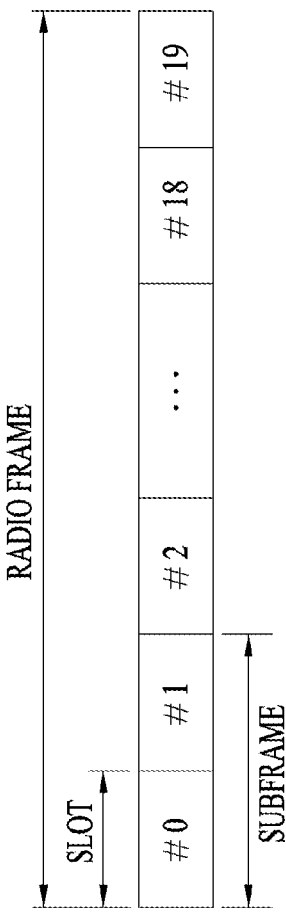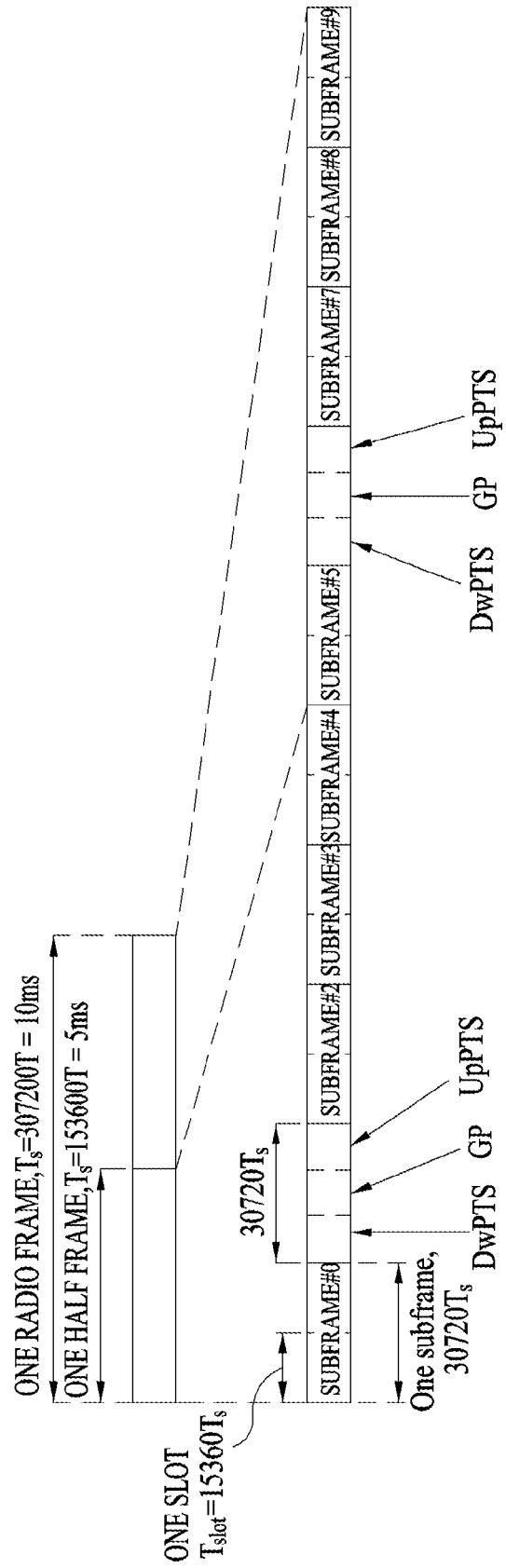

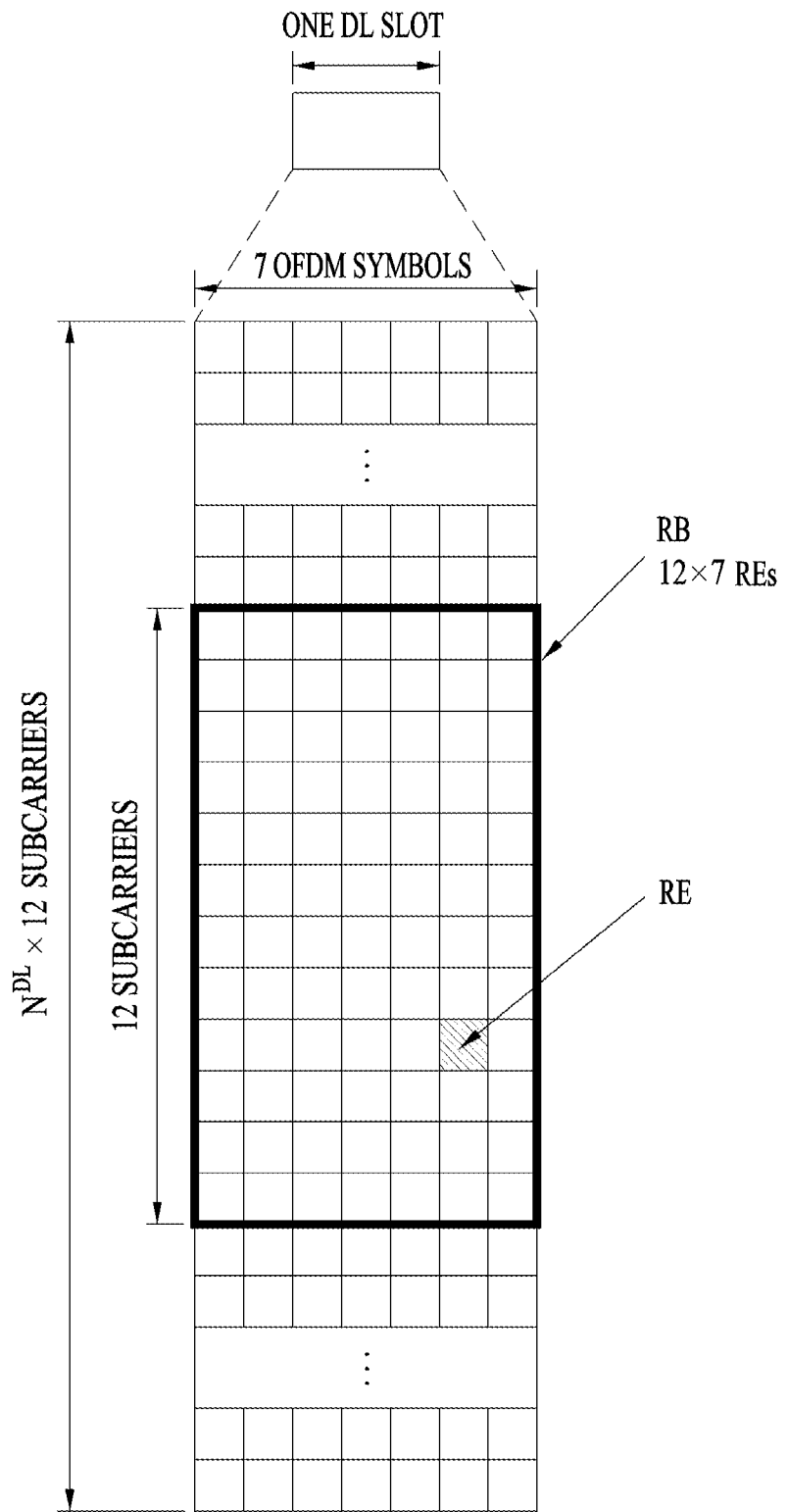

FIG. 7

| | | | | PRB pair #0 | | | | | | | | |
|---|---|---|---|---|---|---|---|---|---|---|---|---|
| | | | | 0 | 4 | 8 | 12 | | | | | |
| | | | | 1 | 5 | 9 | 13 | | | | | |
| | | | | 2 | 6 | 10 | 14 | | | | | |
| | | | | 3 | 7 | 11 | 15 | | | | | |

| PRB pair #1 | | | | | PRB pair #2 | | | | | PRB pair #3 | | | |
|---|---|---|---|---|---|---|---|---|---|---|---|---|---|
| 0 | 4 | 8 | 12 | | 0 | 4 | 8 | 12 | | 0 | 4 | 8 | 12 |
| 1 | 5 | 9 | 13 | | 1 | 5 | 9 | 13 | | 1 | 5 | 9 | 13 |
| 2 | 6 | 10 | 14 | | 2 | 6 | 10 | 14 | | 2 | 6 | 10 | 14 |
| 3 | 7 | 11 | 15 | | 3 | 7 | 11 | 15 | | 3 | 7 | 11 | 15 |

EREG index

Distributed PRB set

PRB pair #0:
| 0 | 1 | 2 | 3 |
| 4 | 5 | 6 | 7 |
| 8 | 9 | 10 | 11 |
| 12 | 13 | 14 | 15 |

Distributed PRB set #0: 0,4,8,12 / 3,7,11,15 / 2,6,10,14 / 1,5,9,13

PRB pair #1 distributed: 1,5,9,13 / 0,4,8,12 / 3,7,11,15 / 2,6,10,14

PRB pair #2 distributed: 2,6,10,14 / 1,5,9,13 / 0,4,8,12 / 3,7,11,15

PRB pair #3 distributed: 3,7,11,15 / 2,6,10,14 / 1,5,9,13 / 0,4,8,12

(a)　　　(b)

(a)　　　(b)

METHOD AND APPARATUS FOR RECEIVING DOWNLINK SIGNAL IN WIRELESS COMMUNICATION SYSTEM

CROSS REFERENCE TO RELATED APPLICATIONS:

This application is the National Phase of PCT International Application No. PCT/KR2014/000874, filed on Jan. 29, 2014, which claims priority under 35 U.S.C. 119(e) to U.S. Provisional Application Nos. 61/759,418, filed on Feb. 1, 2013, 61/761,218 filed on Feb. 5, 2013, 61/818,900 filed on May 2, 2013 and 61/821,680 filed on May 9, 2013, all of which are hereby expressly incorporated by reference into the present application.

TECHNICAL FIELD

The present invention relates to a wireless communication system and, more particularly, to a method and apparatus for receiving a signal in a usage changed subframe.

BACKGROUND ART

Wireless communication systems have been widely deployed in order to provide various types of communication services such as voice or data services. Generally, a wireless communication system is a multiple access system capable of supporting communication with multiple users by sharing available system resources (bandwidth, transmit power, etc.). Multiple access systems include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, and a multi-carrier frequency division multiple access (MC-FDMA) system.

DETAILED DESCRIPTION OF THE INVENTION

Technical Problems

The present invention discloses methods related to transmission and reception of signals such as control information and downlink data in a usage changed subframe.

The technical objects that can be achieved through the present invention are not limited to what has been particularly described hereinabove and other technical objects not described herein will be more clearly understood by persons skilled in the art from the following detailed description.

Technical Solutions

In accordance with a first technical aspect of the present invention, provided herein is a method for receiving a downlink signal by a user equipment in a wireless communication system, including receiving information indicating that usage of a first subframe, which is a special subframe, is changed to be used as a downlink subframe; and decoding a control channel using a first radio network temporary identifier (RNTI) and a second RNTI in the usage changed subframe, wherein, if the control channel has successfully been decoded using the first RNTI, the user equipment assumes that data is present in a downlink pilot time slot (DwPTS) among resource regions indicated by the control channel.

In accordance with a second technical aspect, provided herein is a user equipment in a wireless communication system, including a reception module; and a processor, wherein the processor is configured to receive, through the reception module, information indicating that usage of a first subframe, which is a special subframe, is changed to be used as a downlink subframe, and decode a control channel using a first radio network temporary identifier (RNTI) and a second RNTI in the usage changed subframe, and wherein, if the control channel has successfully been decoded using the first RNTI, the user equipment assumes that data is present in a downlink pilot time slot (DwPTS) among resource regions indicated by the control channel.

The first and second technical aspects of the present invention may include the following description.

If the control channel has successfully been decoded using the second RNTI, the user equipment may assume that the data is present even in a guard period (GP) and an uplink pilot time slot (UpPTS) region among the resource regions indicated by the control channel.

If the control channel has successfully been decoded using both the first RNTI and the second RNTI and if resource regions indicated by a control channel related to the first RNTI and resource regions indicated by a control channel related to the second RNTI overlap, the user equipment may assume that a physical downlink shared channel (PDSCH) is present only in a GP and an UpPTS of the overlapped resource regions.

The user equipment may assume a demodulation reference signal (DMRS) pattern related to the special subframe upon receiving a DMRS in the overlapped resource regions.

If the user equipment is a user equipment recognizing the usage change, the user equipment receives a PDSCH in a GP and an UpPTS of the usage changed subframe.

A user equipment recognizing the usage change and a user equipment incapable of recognizing the usage change in the usage changed subframe may receive a PDSCH in different layers.

If the control information is transmitted through an enhanced physical downlink control channel (EPDCCH), the information indicating the usage change may take priority over an uplink-downlink configuration of system information in receiving the EPDCCH.

If the control information is transmitted through an EPDCCH, the UE may assume that the first subframe is the special subframe upon blind decoding the EPDCCH and decoding a DMRS related to the EPDCCH.

A PDSCH for a user equipment recognizing the usage change may be transmitted in a GP and an UpPTS in a physical resource block (PRB) pair in which the EPDCCH is transmitted.

If the control information is transmitted through an EPDCCH, the user equipment may assume that the first subframe is the downlink subframe upon blind decoding the EPDCCH and assume that the first subframe is the special subframe upon decoding a DMRS related to the EPDCCH.

The user equipment may assume that the first subframe is the special subframe in calculating the number of enhanced control channel elements (ECCEs) per PRB pair upon blind decoding the EPDCCH.

The first RNTI may be one of a random access RNTI (RA-RNTI), a paging RNTI (P-RNTI), and a system information (SI-RNTI).

The second RNTI may be an RNTI capable of being used only by a user equipment recognizing the usage change.

Advantageous Effects

According to the present invention, smooth signal transmission and reception can be performed regardless of user equipment capabilities in a usage changed subframe. In addition, resource efficiency can be increased in a usage changed subframe, Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

FIG. 1(a) and 1(b) show a diagram illustrating a radio frame structure.

FIG. 2 is a diagram illustrating a resource grid in a DL slot.

FIG. 7 is a diagram for explaining EREG-to-ECCE mapping.

BEST MODE FOR CARRYING OUT THE INVENTION

Figure 3:
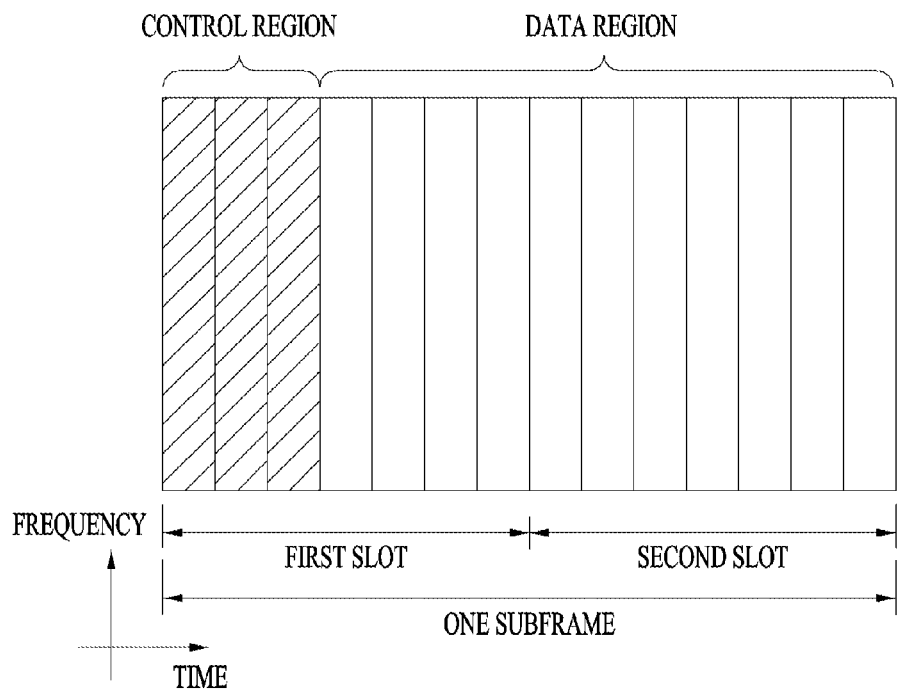
FIG. 3 is a diagram illustrating a downlink subframe structure.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and IEEE 802.16m advanced (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and a plurality of resource blocks (RBs) in the frequency domain. Since 3GPP LTE employs OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol is extended and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

The illustrated radio frame structures are merely examples, and various modifications may be made to the number of subframes included in a radio frame, the number of slots included in a subframe, or the number of symbols included in a slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a DL transmission bandwidth. A UL slot may have the same structure as a DL slot.

FIG. 3 illustrates a DL subframe structure. Up to the first three OFDM symbols of the first slot in a DL subframe are used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmit power control commands for UE groups. The PDCCH delivers information about resource allocation and a transport format for a DL shared channel (DL-SCH), resource allocation information about a UL shared channel (UL-SCH), paging information of a paging channel (PCH), system information on the DL-SCH, information about resource allocation for a higher-layer control message such as a random access response transmitted on the PDSCH, a set of transmit power control commands for individual UEs of a UE group, transmit power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging radio network temporary identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
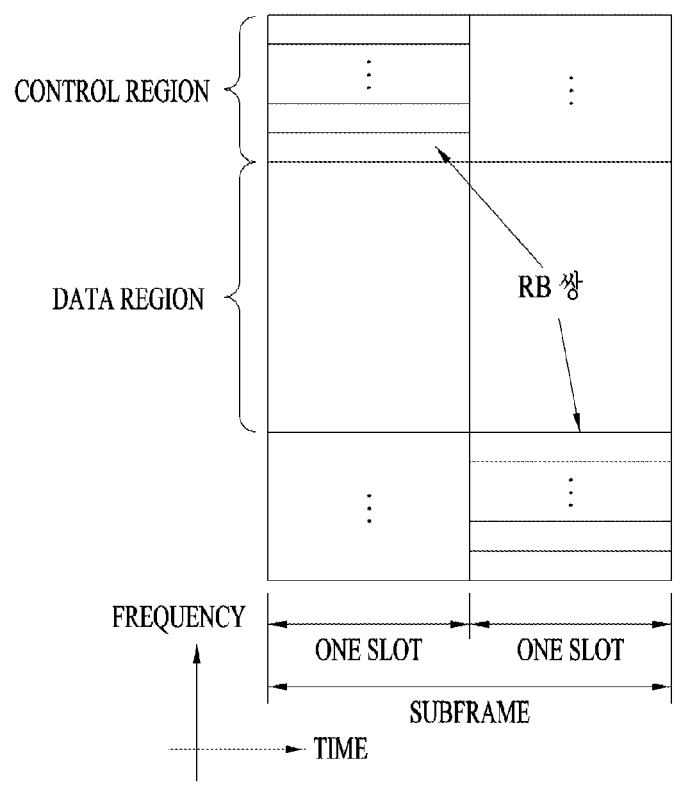
FIG. 4 is a diagram illustrating an uplink subframe structure.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

DCI Format

DCI formats 0, 1, 1A, 1B, 1C, 1D, 2, 2A, 2B, 2C, 3, 3A and 4 are defined in LTE-A (Release 10). DCI formats 0, 1 A, 3 and 3A are defined to have the same message size to reduce the number of times of blind decoding, which will be described later. The DCI formats may be divided into i) DCI formats 0 and 4 used for uplink grant, ii) DCI formats 1, 1A, 1B, 1C, 1D, 2, 2A, 2B and 2C used for downlink scheduling allocation, and iii) DCI formats 3 and 3A for power control commands according to purposes of use of control information to be transmitted.

DCI format 0 used for uplink grant may include a carrier indicator necessary for carrier aggregation, which will be described later, an offset (flag for format 0/format 1A differentiation) used to differentiate DCI formats 0 and 1A from each other, a frequency hopping flag that indicates whether frequency hopping is used for uplink PUSCH transmission, information about resource block assignment, used for a UE to transmit a PUSCH, a modulation and coding scheme, a new data indicator used to empty a buffer for initial transmission in relation to a HARQ process, a transmit power control (TPC) command for a scheduled PUSCH, information about a cyclic shift for a demodulation reference signal (DMRS) and OCC index, and a UL index and channel quality indicator request (CSI request) necessary for a TDD operation, etc. DCI format 0 does not include a redundancy version, unlike DCI formats relating to downlink scheduling allocation since DCI format 0 uses synchronous HARQ. The carrier indicator is not included in DCI formats when cross-carrier scheduling is not used.

DCI format 4, which is newly added to DCI formats in LTE-A Release 10, supports application of spatial multiplexing to uplink transmission in LTE-A. DCI format 4 has a larger message size DCI format 0 because it further includes information for spatial multiplexing. DCI format 4 includes additional control information in addition to control information included in DCI format 0. That is, DCI format 4 includes information on a modulation and coding scheme for the second transmission block, precoding information for multi-antenna transmission, and sounding reference signal (SRS) request information. DCI format 4 does not include an offset for differentiation between formats 0 and 1A because it has a larger size than DCI format 0.

DCI formats 1, 1A, 1B, 1C, 1D, 2, 2A, 2B and 2C for downlink scheduling allocation may be broadly divided into DCI formats 1, 1A, 1B, 1C and 1D, which do not support spatial multiplexing, and DCI formats 2, 2A, 2B and 2C, which support spatial multiplexing.

DCI format 1C supports only frequency contiguous allocation as compact frequency allocation and does not include the carrier indicator and redundancy version, compared to the other formats.

DCI format 1A is for downlink scheduling and random access. DCI format 1A may include a carrier indicator, an indicator that indicates whether downlink distributed transmission is used, PDSCH resource allocation information, a modulation and coding scheme, a redundancy version, a HARQ processor number for indicating a processor used for soft combining, a new data indicator used to empty a buffer for initial transmission in relation to a HARQ process, a TPC command for a PUCCH, an uplink index necessary for a TDD operation, etc.

DCI format 1 includes control information similar to that of DCI format 1A. DCI format 1 supports non-contiguous resource allocation, while DCI format 1A is related to contiguous resource allocation. Accordingly, DCI format 1 further includes a resource allocation header, and thus slightly increases control signaling overhead as a trade-off for an increase in flexibility of resource allocation.

Both DCI formats 1B and 1D further include precoding information, compared to DCI format 1. DCI format 1B includes PMI acknowledgement and DCI format 1D includes downlink power offset information. Most control information included in DCI formats 1B and 1D corresponds to that of DCI format 1A.

DCI formats 2, 2A, 2B and 2C basically include most control information included in DCI format 1A and further include information for spatial multiplexing. The information for spatial multiplexing includes a modulation and coding scheme for the second transmission block, a new data indicator, and a redundancy version.

DCI format 2 supports closed loop spatial multiplexing, and DCI format 2A supports open loop spatial multiplexing. Both DCI formats 2 and 2A include precoding information. DCI format 2B supports dual layer spatial multiplexing combined with beamforming and further includes cyclic shift information for a DMRS. DCI format 2C, which may be regarded as an extended version of DCI format 2B, supports spatial multiplexing for up to 8 layers.

DCI formats 3 and 3A may be used to complement the TPC information included in the aforementioned DCI formats for uplink grant and downlink scheduling allocation, namely, to support semi-persistent scheduling. A 1-bit command is used per UE in the case of DCI format 3, while a 2-bit command is used per UE in the case of DCI format 3A.

One of the DCI formats described above is transmitted through a PDCCH, and a plurality of PDCCHs may be transmitted in a control region. A UE may monitor the plurality of PDCCHs.

PDCCH Processing

Control channel elements (CCEs), contiguous logical allocation units, are used to map a PDCCH to REs for efficient processing. A CCE includes a plurality of resource element groups (e.g., 9 REGs). Each REG includes four neighboring REs other than an RS.

The number of CCEs necessary for a specific PDCCH depends on a DCI payload corresponding to a control information size, a cell bandwidth, a channel coding rate, etc. Specifically, the number of CCEs for a specific PDCCH may be defined according to PDCCH formats as shown in Table 1.

TABLE 1

| PDCCH format | Number of CCEs | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

As described above, one of the four formats may be used for a PDCCH and is not known to the UE. Accordingly, the UE performs decoding without knowing the PDCCH format. This is called blind decoding. Since operation overhead is generated if a UE decodes all the CCEs usable for downlink for each PDCCH, a search space is defined in consideration of restriction on a scheduler and the number of decoding attempts.

That is, the search space is a set of candidate PDCCHs composed of CCEs on which a UE needs to attempt to perform decoding at an aggregation level. Each aggregation level and the corresponding number of candidate PDCCHs may be defined as shown in Table 2.

TABLE 2

| Search space | Aggregation level | Size (CCE unit) | Number of PDCCH candidates |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

As shown Table 2, the UE has a plurality of search spaces at each aggregation level because 4 aggregation levels are present. The search spaces may be divided into a UE-specific search space and a common search space, as shown in Table 2. The UE-specific search space is for specific UEs. Each UE may check an RNTI and CRC which mask a PDCCH by monitoring a UE-specific search space (USS) thereof (attempting to decode a PDCCH candidate set according to an available DCI format) and acquire control information when the RNTI and CRC are valid.

The common search space (CSS) is used for a case in which a plurality of UEs or all UEs need to receive PDCCHs, for system information dynamic scheduling or paging messages, for example. The CSS may be used for a specific UE for resource management. Furthermore, the CSS may overlap the UE-specific search space. The control information for the UEs may be masked by one of RA-RNTI, SI-RNTI and P-RNTI.

Specifically, the search space may be determined by Equation 1 given below.

$$L\{(Y_k+m') \bmod \lfloor N_{CCE,k}/L \rfloor\}+i \quad \text{Equation 1}$$

Here, L denotes an aggregation level, $Y_k$ is a variable determined by an RNTI and subframe number k, and m' is the number of PDCCH candidates. If carrier aggregation is applied, $m'=m+M^{(L)} \cdot n_{CI}$ and otherwise, $m'=m$. Herein, $M^{(L)}$ is the number of PDCCH candidates. $N_{CCE,k}$ is the total number of CCEs in the control region of a k-th subframe, and i is a factor indicating an individual CCE in each PDCCH candidate and is set as i=0, 1, ..., L-1. For the CSS, $Y_k$ is always determined to be 0.

Figure 5:
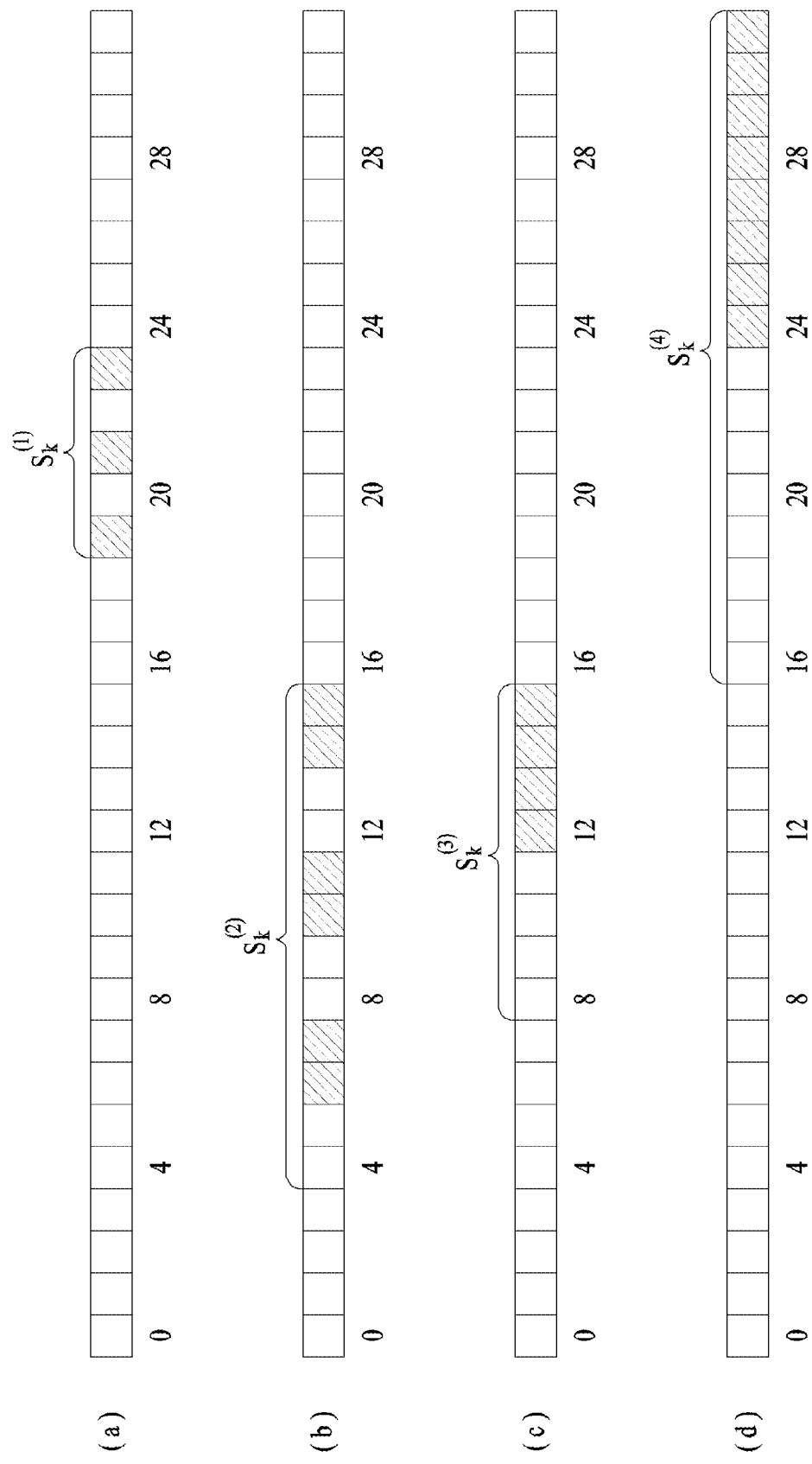
FIG. 5 is a diagram for explaining a search space.

FIG. 5 shows USSs (shaded portions) at respective aggregation levels which may be defined according to Equation 1. Carrier aggregation is not used, and $N_{CCE,k}$ is set to 32 for simplicity of illustration.

FIGS. 5(a), 5(b), 5(c) and 5(d) illustrate the cases of aggregation levels 1, 2, 4 and 8, respectively. The numbers represent CCE numbers. In FIG. 5, the start CCE of a search space at each aggregation level is determined based on an RNTI and subframe number k. This CCE may be differently determined among the aggregations levels in the same subframe for a UE due to the modulo function and L. The CCE is always determined to correspond to a multiple of the aggregation level due to L. In the description given below, $Y_k$ is assumed to be CCE 18. The UE attempts to sequentially perform decoding from the start CCE in units of CCEs determined for a corresponding aggregation level. In FIG. 5(b), for example, The UE attempts to perform decoding from CCE 4, the start CCE, for every two CCEs according to the aggregation levels.

In this manner, the UE attempts to perform decoding for a search space. The number of decoding attempts is determined by a DCI format and a transmission mode determined through radio resource control (RRC) signaling. If carrier aggregation is not applied, the UE needs to attempt to perform decoding up to 12 times in a CSS, in consideration of two DCI sizes (DCI formats 0/1 A/3/3A and DCI format 1C) for each of six PDCCH candidates. In a USS, the UE needs to attempt to perform decoding up to 32 times, in consideration of two DCI sizes for each of 16 PDCCH candidates (6+6+2+2=16). Accordingly, when carrier aggregation is not applied, the UE needs to attempt to perform decoding up to 44 times.

On the other hand, if carrier aggregation is applied, the maximum number of decodings increases because as many decodings for a USS and DCI format 4 as the number of DL resources (DL component carriers) are added.

Reference Signal (RS)

In transmitting packets in a wireless communication system, the packets are transmitted over a radio channel, and therefore signal distortion may occur in the transmission process. For a receiver to receive the correct signal in spite of signal distortion, the received distorted signal should be corrected using channel information. In detecting the channel information, a signal which is known to both the transmitter and the receiver is transmitted and the degree of distortion of the signal received over the channel is used to detect the channel information. This signal is referred to as a pilot signal or a reference signal.

In the case in which data is transmitted and received using multiple antennas, a channel state between a transmit antenna and a receive antenna needs to be identified to receive a correct signal. Accordingly, a separate RS is needed for each transmit antenna and, more particularly, for each antenna port.

RSs may be divided into a UL RS and a DL RS. In the current LTE system, the UL RSs include:

i) a demodulation-reference signal (DM-RS) for channel estimation for coherent demodulation of information transmitted over a PUSCH and a PUCCH, and ii) a sounding reference signal (SRS) for measuring UL channel quality at frequencies of different networks in the BS.

The DL RSs include:

i) a cell-specific reference signal (CRS) shared by all UEs in a cell;

ii) a UE-specific reference signal for a specific UE;

iii) a demodulation-reference signal (DM-RS) transmitted for coherent demodulation in the case of transmission of a PDSCH;

iv) a channel state information-reference signal (CSI-RS) for delivering channel state information (CSI) in the case of transmission of a DL DMRS;

v) a multimedia broadcast single frequency network (MBSFN) reference signal transmitted for coherent demodulation of a signal transmitted in an MBSFN mode, and vi) a positioning reference signal used to estimate geographic position information of a UE.

The RSs may be broadly divided into two reference signals according to the purposes thereof. There are an RS used to acquire channel information and an RS used for data demodulation. Since the former is used when the UE acquires channel information on DL, this RS should be transmitted over a wide band and even a UE which does not receive DL data in a specific subframe should receive the RS. This RS is also applied to situations such as handover. The latter RS is sent by the BS along with a resource on DL. The UE may receive the RS to perform channel measurement to implement data modulation. This RS should be transmitted in a region in which data is transmitted.

The CRS is used for acquisition of channel information and for data demodulation, and the UE-specific RS is used only for data demodulation. The CRS is transmitted in every subframe in a wide band and RSs for up to four antenna ports are transmitted according to the number of transmit antennas of the BS.

For example, if the number of transmit antennas of the BS is 2, CRSs for antenna ports #0 and #1 are transmitted. If the number of transmit antennas of the BS is 4, CRSs for antenna ports #0 to #3 are respectively transmitted.

Figure 6A:
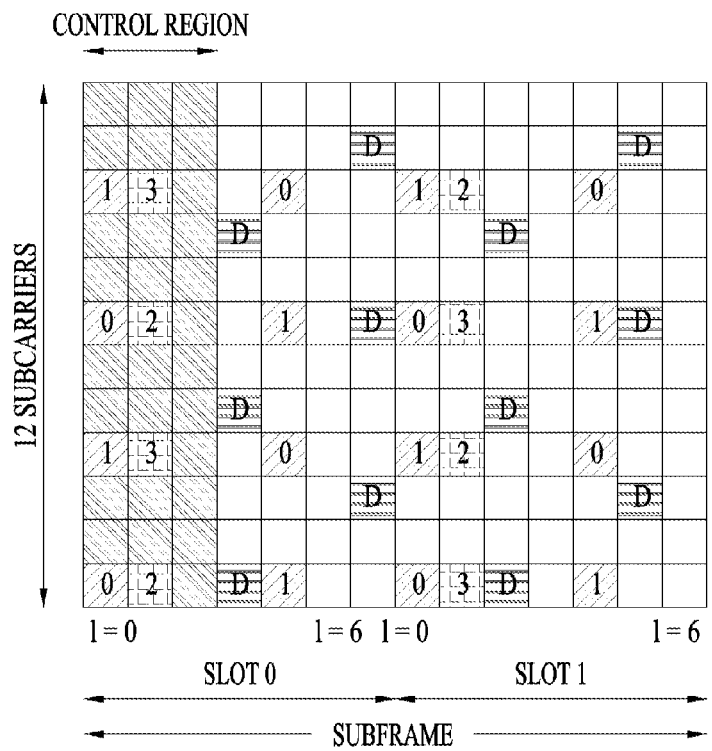
FIG. 6(a) and 6(b) show a diagram for explaining a reference signal.
Figure 6B:
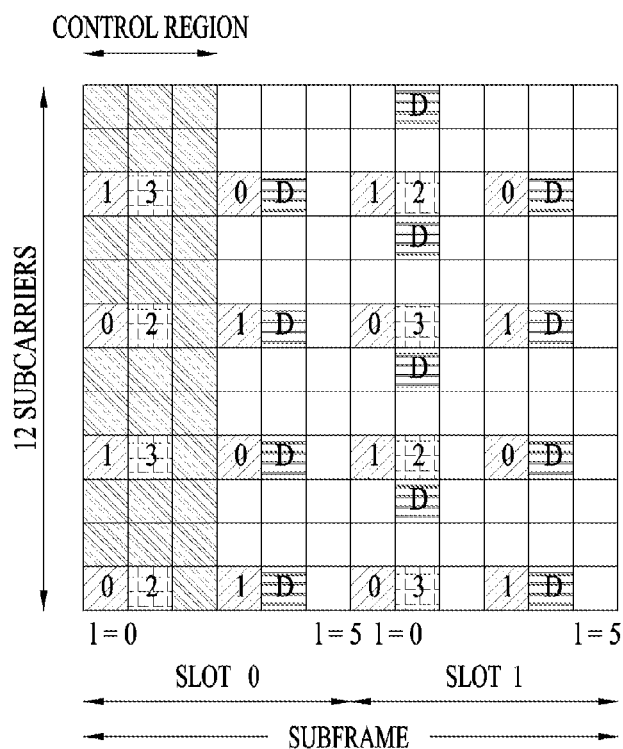

FIG. 6 is a diagram illustrating a pattern in which CRSs and DRSs defined in a legacy 3GPP LTE system (e.g., Release-8) are mapped to resource block (RB) pairs. A downlink RB pair, as a unit to which an RS is mapped, may be represented as a unit of one subframe in the time domain times 12 subcarriers in the frequency domain. That is, one RB pair has a length of 14 OFDM symbols for a normal CP (FIG. 6(a)) and a length of 12 OFDM symbols for an extended CP (FIG. 6(b)).

FIG. 6 shows locations of RSs on RB pairs in a system in which the BS supports four transmit antennas. In FIG. 6, resource elements (REs) denoted by "0", "1", "2" and "3" represent the locations of the CRSs for antenna port indexes 0, 1, 2 and 3, respectively. In FIG. 6, REs denoted by "D" represent locations of the DMRSs.

Enhanced-PDCCH(EPDCCH)

An EPDCCH that may be transmitted in a legacy PDSCH region is under consideration as a solution to the lack of PDCCH capacity caused by coordinated multi-point (CoMP), multi-user multiple input multiple output (MU-MIMO), etc. and to reduction of PDCCH performance caused by inter-cell interference in an LTE system conforming to release 11 or beyond. Unlike a legacy CRS-based PDCCH, the EPDCCH allows for DMRS-based channel estimation in order to achieve precoding gain.

Depending on the configuration of a physical resource block (PRB) pair used for EPDCCH transmission, localized EPDCCH transmission and distributed EPDCCH transmission may be defined. The localized EPDCCH transmission means that enhanced control channel elements (ECCEs) used for one DCI transmission are contiguous in the frequency domain and specific precoding may be used to achieve beamforming gain. For example, the localized EPDCCH transmission may be based on contiguous ECCEs of a number corresponding to an aggregation level. On the contrary, the distributed EPDCCH transmission means that one EPDCCH is transmitted in PRB pairs distributed in the frequency domain and has gain in terms of frequency diversity. For example, the distributed EPDCCH transmission may be based on an ECCE having 4 enhanced resource element groups (EREGs) included in each distributed PRB pair. One or two EPDCCH PRB sets may be configured for a UE by higher layer signaling and each EPDCCH PRB set may be used for either the localized EPDCCH transmission or the distributed EPDCCH transmission. If two EPDCCH PRB sets are present, all or part of the two sets may overlap.

An eNB may map control information to REs of an EREG allocated for an EPDCCH in one or more EPDCCH PRB sets and then transmit the control information. The EREG is used to define mapping of a control channel to REs. 16 EREGs (EREG numbers 0 to 15) may be included in one PRB pair. 4 EREGs (or 8 EREGs in some cases) may constitute one ECCE and x ECCEs (where x is one of 1, 2, 4, 8, 16, and 32) may constitute one EPDCCH. In the case of the distributed EPDCCH transmission, EREGs that are present in multiple PRB pairs for diversity may constitute one ECCE. More specifically, in the case of the distributed EPDCCH transmission, EREG-to-ECCE mapping (hereinafter, a first ECCE number-EREG number-PRB number relationship) may indicate "an ECCE index in an EPDCCH PRB set corresponds to EREG index $$\left\lfloor \frac{n_{ECCE}}{N_P} \right\rfloor + i \ast N_{CP}$$

in PRB pair index $$\left( n_{ECCE} + i \ast \max\left(1, \left\lfloor \frac{N_P}{N} \right\rfloor \right) \right)$$

mod $N_P$". Here, N is the number of EREGs per ECCE, $N_{CP}$ is the number of ECCEs per PRB pair, $N_{P,set1}$ is the number of PRB pairs in a first EPDCCH PRB set, $N_{P,set2}$ is the number of PRB pairs in a second EPDCCH PRB set, and i=0, 1, ..., N−1. For example, if 4 PRB pairs are included in an EPDCCH PRB set, according to the first ECCE number-EREG number-PRB number relationship, ECCE index number 0 is composed of EREG number 0 of PRB pair number 0, EREG number 4 of PRB pair number 1, EREG number 8 of PRB pair number 2, and EREG number 12 of PRB pair number 4. The EREG-to-ECCE mapping relationship is illustrated in FIG. 7.

To receive/acquire DCI from an EPDCCH, a UE may perform blind decoding in a similar manner to a legacy LTE/LTE-A system. More specifically, the UE may attempt to decode (monitor) a set of EPDCCH candidates at each aggregation level, for DCI formats corresponding to a configured transmission mode. The set of the EPDCCH candidates to be monitored may be referred to as an EPDCCH USS and this search space may be configured/set for each aggregation level. Unlike the afore-described legacy LTE/LTE-A system, aggregation levels {1, 2, 4, 8, 16, 32} are available according to a subframe type, a CP length, and the amount of available resources in a PRB pair.

If an EPDCCH is configured for a UE, the UE may index REs included in PRB pairs to EREGs and then index the EREGs to ECCEs. The UE determines EPDCCH candidates constituting a search space based on the indexed ECCEs and performs blind decoding on the EPDCCH candidates, thereby receiving the DCI.

Upon receiving an EPDCCH, the UE may transmit an ACK/NACK for the EPDCCH on a PUCCH. The indexes of resources for ACK/NACK transmission, i.e., the indexes of PUCCH resources may be determined by the lowest of the indexes of ECCEs used for the EPDCCH transmission, similarly to Equation 1 described previously. Namely, the indexes of PUCCH resources may be expressed by Equation 2.

$$n_{PUCCH\text{-}ECCE}^{(1)} = n_{ECCE} + N_{PUCCH}^{(1)} \qquad \text{Equation 2}$$

In Equation 2, $n_{PUCCH\text{-}ECCE}^{(1)}$ denotes a PUCCH resource index, $n_{ECCE}$ denotes the lowest of the indexes of ECCEs used for EPDCCH transmission, and $N_{PUCCH}^{(1)}$ (which may be expressed as $N_{PUCCH,EPDCCH}^{(1)}$) represents the starting point of PUCCH resource indexes, indicated by higher layer signaling.

However, if a PUCCH resource index is determined unconditionally by Equation 2, resource collision may occur. For example, if two EPDCCH PRB sets are configured, ECCE indexing in each EPDCCH PRB set is independent. Therefore, there may be the case in which the lowest ECCE indexes in the EPDCCH PRB sets are equal. Although this problem may be solved by setting different PUCCH resource starting points for different users, allocation of different PUCCH resource starting points for all users means reservation of a large number of PUCCH resources, which is inefficient. Further, since DCI from a plurality of users may be transmitted at the same ECCE position on an EPDCCH, as in MU-MIMO, there is a need for a method for allocating PUCCH resources in consideration of these factors. To avoid the resource collision problem, a HARQ-ACK resource offset (ARO) has been introduced. The ARO avoids collision between PUCCH resources by shifting, by a predetermined degree, a PUCCH resource determined by the lowest of the indexes of ECCEs constituting an EPDCCH and by a PUCCH resource start offset transmitted by higher layer signaling. The ARO is indicated as shown in Table 3 through 2 bits of DCI format 1/1A/1B/1D/2/2A/2B/2C/2D transmitted on the EPDCCH.

TABLE 3

| ACK/NACK Resource offset field in DCI format 1A/1B/1D/1/2A/2/2B/2C/2D | $\Delta_{ARO}$ |
|---|---|
| 0 | 0 |
| 1 | −1 |
| 2 | −2 |
| 3 | 2 |

For a specific UE, an eNB may inform the specific UE of an ARO to be used for PUCCH resource determination through a DCI format after designating one of ARO values of Table 3. The UE may detect an ARO field in a DCI format thereof and transmit ACK/NACK through a PUCCH resource determined using the ARO value.

eIMTA (enhanced Interference Management and Traffic Adaptation)

In the case of TDD, each subframe is preset to be used for either UL or DL (except for a special subframe for switching between UL and DL). Specifically, referring to Table 4 shown below, in the case of UL-DL configuration 0 for example, subframe numbers 0 and 5 in one radio frame are preset to be used for DL and subframe numbers 2, 3, 4, 7, 8, and 9 in one radio frame are preset to be used for DL. A UL-DL configuration to be used by a specific eNB may be provided to a UE as part of system information (e.g. SIB 1). In addition, contiguous eNBs may be forced to use the same TDD configuration, i.e., the UL-DL configuration for reasons of interference, etc.

TABLE 4

| Uplink-downlink Configu-ration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

(D: subframe for DL transmission, U: subframe for uplink transmission, S: special subframe)

If the amount of data transmitted from each cell on UL or DL is remarkably increased even though a system operates according to the UL-DL configuration as shown in Table 4, usage of subframes may be changed for smooth transmission of data. For example, one or more subframes configured as a UL or special subframe may be used as subframes for DL transmission or, conversely, one or more subframes for DL transmission may be used as UL or special subframes to raise the efficiency of subframe use.

Thus, if the usage of a subframe is changed, especially, if the usage of a special subframe is changed to be used as a DL subframe (hereinafter, this subframe is referred to as an SD subframe), problems may occur due to coexistence of a UE that is incapable of recognizing usage change (indication information) (hereinafter, referred to as a legacy UE (LUE)) and a UE that is capable of recognizing usage change (hereinafter, referred to as an advanced UE (AUE)). As an example, for the LUE, system information may be transmitted only to a DwPTS region in a specific PRB pair of the SD subframe, and both the LUE and the AUE may try to receive the system information in the specific PRB pair. In this case, both the LUE and the AUE try to decode the system information in the specific PRB pair indicated by a PDCCH/EPDCCH and the LUE may acquire the system information in the DwPTS without any problem because the LUE recognizes the SD subframe as a special subframe. However, since the AUE will recognize the SD subframe as a DL subframe, the AUE will try to acquire the system information in the entire specific PRB pair (including a GP and an UpPTS). Therefore, the AUE tries to decode the system information even on REs on which the system information is not actually transmitted and thus the AUE may not correctly receive the system information. Accordingly, in order to solve the above problems, embodiments related to a DMRS pattern, PDSCH transmission, measurement, etc. will now be described.

Embodiment 1

In the first embodiment, a UE that has received information indicating that the usage of a special subframe is changed to be used as a DL subframe makes different assumptions that are used when the UE performs decoding in an SD subframe according to an RNTI. More specifically, a UE (especially, AUE) may blind decode, in an SD frame, a control channel (PDCCH/EPDCCH) using one (first RNTI) of an RA-RNTI, a P-RNTI, and an SI-RNTI and using an RNTI (a second RNTI, which may be an RNTI available only by a second UE) for the AUE. As a result, if the UE has successfully decoded the control channel using the first RNTI, the UE may assume that data is present in a DwPTS region among resource regions indicated by the control channel. If the UE has successfully decoded the control channel using the second RNTI, the UE may assume that data is present in a GP and an UpPTS as well as the DwPTS region among the resource regions indicated by the control channel. This may be understood as meaning that using a special subframe as a DL subframe in an SIB is limited to unicast for the AUE. In the above case, there are no problems in operation because an LUE may decode the control channel using the first RNTI and receive transmitted system information etc. in the DwPTS region.

Figure 8:
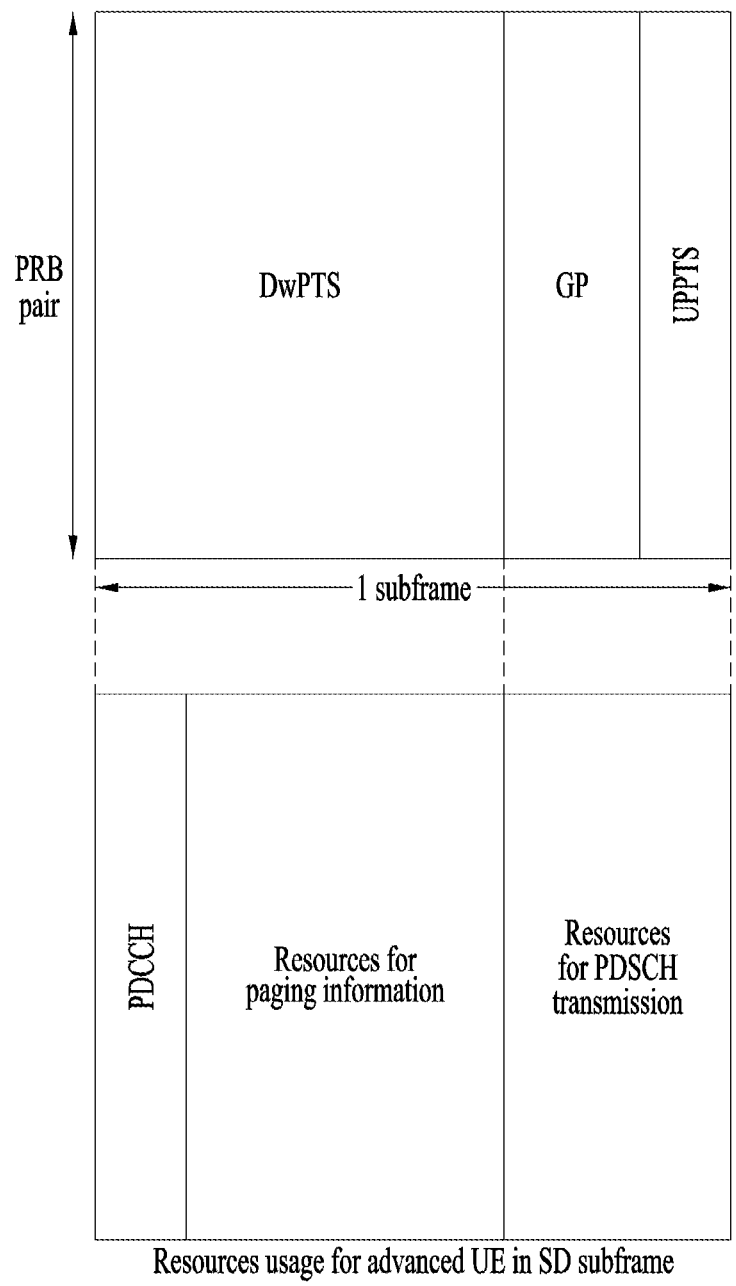
FIG. 8 to FIG. 10 are diagrams for explaining embodiments of the present invention.

If the UE has successfully decoded the control channel using both the first RNTI and the second RNTI and a resource region indicated by the control channel related to the first RNTI overlaps a resource region indicated by the control channel related to the second RNTI, the UE may assume that a PDSCH is transmitted in a GP and an UpPTS of the overlapped resource region. FIG. 8 illustrates the above example. FIG. 8 is based on the premise that a PDCCH is masked by a P-RNTI and the PDCCH indicates a DwPTS region. Referring to FIG. 8, if an AUE has successfully blind decoded the PDCCH using a P-RNTI (first RNTI), the AUE may receive paging information in the DwPTS region. In addition, if a PRB pair is included in DL ACK as a result that the AUE decodes the PDCCH using a second RNTI, the AUE may receive a PDSCH in a GP and an UpPTS region.

Hereinbelow, embodiments relating to a DMRS pattern, PDSCH transmission, and EPDCCH transmission, for an AUE and an LUE, will be sequentially described. The following description may be based on the premise of Embodiment 1 or may be independently applied to each embodiment.

Embodiment 2—DMRS Pattern

An SD subframe may be based on a DMRS. For example, an EPDCCH may be transmitted in the SD subframe and a DMRS related to the EPDCCH may be used for channel estimation to decode the EPDCCH. Alternatively, a PDSCH for a UE may be transmitted in the SD subframe and the DMRS is used for channel estimation to decode the PDSCH. In this case, if an LUE and an AUE assume different DMRS patterns, problems may arise. For example, when the AUE and the LUE receive the PDSCH in a specific PRB pair of the SD subframe, if the AUE and LUE do not assume the same DMRS pattern, ECCE mapping or orthogonality between DMRS ports may be problematic. To solve these problems, an eNB may signal a DMRS pattern to the UEs on a PRB pair basis (subframe set or PRB pair set basis). For example, the eNB may signal, to the UEs, a DMRS pattern in which specific PRB pairs correspond to special subframe configurations 1, 2, 6, and 7 (or 3, 4, 8, and 9) in the SD subframe and the UEs may always use the signaled DMRS pattern in the SD subframe. As another embodiment, it may be defined that the AUE always assumes a normal subframe in the SD subframe.

Meanwhile, the above example may be similarly applied to a CRS. For example, the AUE may assume that the CRS applied to a special subframe is transmitted in the SD subframe through signaling (or this may be predefined). In other words, it may be assumed that the CRS is transmitted only in a DwPTS region in the SD subframe. Alternatively, it may be assumed that the CRS is transmitted in all regions in the SD subframe.

The above examples may be applied only when the LUE and the AUE perform DMRS-based demodulation and share the same resource (e.g. PRB pair). This is because, if a PRB pair of the SD subframe is used only for the AUE, a DMRS pattern for a special subframe need not be used in the PRB pair.

Embodiment 3—PDSCH Transmission

In an SD subframe, a PDSCH for an AUE may be transmitted in a GP and an UpPTS region. Since resources are allocated on an RB basis, an eNB may inform the AUE of such information by higher layer signaling in order for the AUE to recognize the PDSCH for the AUE in the GP and UpPTS region. Alternatively, the eNB may inform the AUE by higher layer signaling that partial PDSCH transmission is performed in a specific PRB pair. Upon receipt of this information, the AUE may assume that the PDSCH is transmitted in the GP and the UpPTS of a corresponding subframe. In this case, a DMRS pattern may be associated with a special subframe. In addition, the AUE may use the same DMRS port as a DMRS port used by an LUE and, for this purpose, the eNB may select the LUE and the AUE using the same resource from contiguous UEs. That is, UEs requiring beams of similar directions may be combined.

As another embodiment, the LUE and the AUE may receive the PDSCH in different layers. In this case, a DMRS pattern may relate to a special subframe or may be signaled, as described above. If the DMRS patterns of the LUE and the AUE are different, CDM groups used by the respective UEs may be differently designated. For example, the LUE may use CDM group 0 (ports 7 and 8) and the AUE may use CDM group 1 (ports 9 and 10).

As still another embodiment, power corresponding to a region unused by the LUE may be used for the AUE. In this case, if the LUE and the AUE receive the PDSCH through different PRB pairs (or different layers), the eNB may signal to the AUE that a PDSCH transmit power is boosted to a predetermined value or more on symbols corresponding to the GP and the UpPTS.

Meanwhile, an RE mapping pattern in an SD subframe may be signaled. Signaling may be higher layer signaling or may be a form of defining a plurality of RE mapping patterns by higher layer signaling and indicating a specific RE mapping pattern through a physical layer signal. Signaling of the RE mapping pattern may include information about a DMRS/CRS pattern and an UpPTS. The information regarding the UpPTS may be information indicating that a PDSCH or an EPDCCH of the AUE is rate-matched (i.e. PDSCH/EPDCCH transmission is performed only in the GP) on a corresponding symbol when an SRS and/or a PRACH of the LUE is transmitted in the UpPTS. If UL transmission of the LUE is performed only in the UpPTS of part of SD subframes, a corresponding subframe set may be signaled. That is, the AUE may assume that the PDSCH/EPDCCH is mapped to the GP and the UpPTS in some SD subframes and the PDSCH/EPDCCH is transmitted only in the GP in signaled SD subframe(s).

Embodiment 4—EPDCCH Transmission

In regard to EPDCCH transmission in an SD subframe, the third embodiment of the present invention includes the following four cases.

Figure 9:
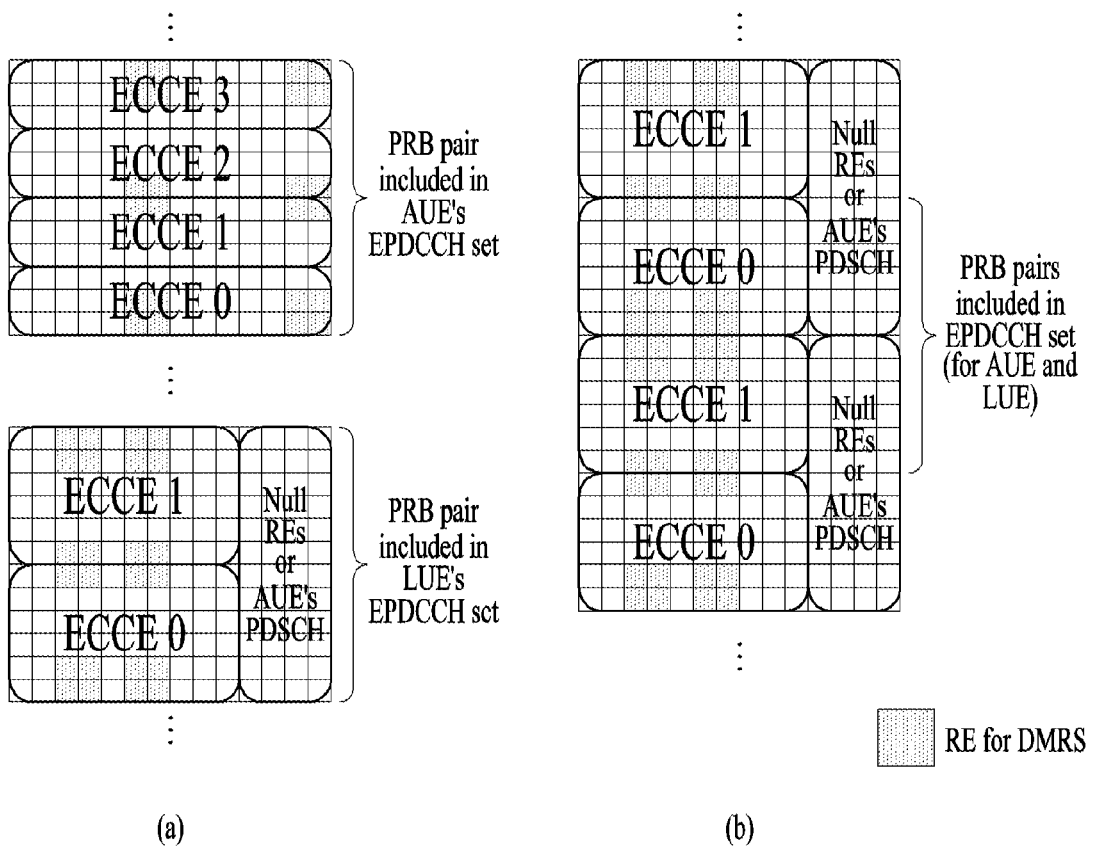

First, an EPDCCH PRB set for an LUE and an EPDCCH PRB set for an AUE may be differently configured. Namely, the LUE may receive an EPDCCH based on a special subframe as indicated by an SIB and the AUE may receive an EPDCCH based on an SD subframe. This may mean that information indicating that the usage of the special subframe is changed to be used as a DL subframe takes priority over a UL-DL configuration of the SIB. With regard to a DMRS pattern, the LUE may use a DMRS pattern related to the special subframe and the AUE may use a DMRS pattern related to a normal subframe. FIG. 9(a) illustrates an SD subframe to which the above description is applied. As illustrated, different DMRS patterns may be present in one subframe.

Second, the AUE may assume a special subframe upon receiving an EPDCCH and a DMRS. For example, in the case of special subframe configurations 1, 2, 6, 7, and 9 in an EPDCCH set of an SD subframe, the AUE may configure a search space by assuming two ECCEs (one ECCE equals to 8 EREGs) per PRB pair. That is, the AUE may operate on an assumption of a normal DL subframe in an SD subframe but perform an operation related to EPDCCH reception based on a special subframe configuration on an SIB. Then, since the same EPDCCH set may be configured for the LUE and the AUE, resources can be efficiently used. However, since GP and UpPTS resources may be wasted in terms of the AUE, a PDSCH for the AUE may be transmitted in the GP and the UpPTS region. Alternatively, if a PRB pair in which an EPDCCH is detected and a PRB pair to which allocation of a PDSCH is indicated overlap, a DwPTS region in the overlapped PRB pairs may be rate matched in PDSCH transmission. In this case, rate matching information may be indicated to the UE by higher layer signaling or physical layer signaling. PDSCH transmission for the AUE in the GP and the UpPTS may also be applied to PDSCH of the LUE in the above first case. FIG. 9(b) illustrates the above-described second case. Referring to 9(a), both the AUE and the LUE may assume that an SD subframe is a special subframe in the SD subframe.

Third, a DMRS pattern may be formed based on a special subframe and EPDCCH blind decoding may be performed based on a DL subframe. This example is illustrated in FIG. 10(a). The AUE may consider a DMRS based on a DMRS pattern related to a special subframe and perform EPDCCH reception based on a normal subframe (indexing of REs of the GP and the UpPTS). In this case, if the AUE and the LUE have the same EPDCCH sets, the size of the EPDCCH sets may be equal but the number of ECCEs per set may be different, thereby causing collision between PUCCH resources. This problem may be solved by signaling a prescribed offset by higher layer signaling. If the number of available REs in special subframes 3, 4, and 8 is less than 104, the LUE may assume that an EPDCCH is rate matched in the GP and the UpPTS and that a minimum aggregation level is 2 for EPDCCH decoding performance. On the other hand, the AUE may assume that the EPDCCH is transmitted in regions corresponding to the GP and the UpPTS in a special subframe and that a minimum aggregation level is 1.

Figure 10:
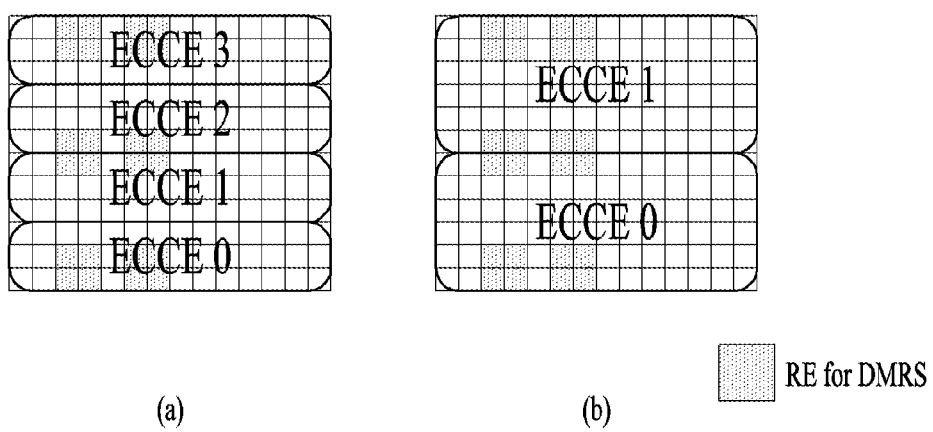

Fourth, a DMRS pattern may be formed based on a special subframe and EPDCCH blind decoding may be performed based on a DL subframe. In this case, the number of ECCEs per PRB pair may be calculated based on the special subframe. This example is illustrated in FIG. 10(b). Referring to FIG. 10, it can be appreciated that a DMRS relates to the special subframe and an ECCE for EPDCCH reception is determined based on the special subframe.

Fifth, a subframe type that the AUE should assume for EPDCCH transmission in an SD subframe may be configured.

The SD subframe is used for DL transmission while considering the above description and the next subframe of the SD subframe is used as a UL subframe. In this case, a time duration for reception-transmission switching of the AUE is needed and, therefore, the eNB may indicate the UE that a specific symbol of the next subframe of the SD subframe is a duration for performing UL transmission (i.e. the UE that has received such signaling may perform the GP and UpPTS operation of an existing special subframe in the duration). For example, the UL subframe following the SD subframe is a 'reduced UL subframe' type and a start symbol of UL transmission in the reduced UL subframe type may be predefined or may be indicated to the UE by higher layer signaling.

The above description is not limited to the SD subframe and is applicable to the case in which a specific subframe (specific PRB pair(s) of a specific subframe) uses a configuration (RS, PDSCH transmission, or EPDCCH) different from configurations of other subframes (specific PRB pair(s) of other subframes).

Meanwhile, if the usage of the DL subframe is changed to be used as the special subframe (hereinafter, DS subframe), it is necessary to determine which configuration is used in the DS subframe. The DS subframe may be configured only in the case of a new carrier type (NCT) that does not damage measurement accuracy. In the DS subframe, a special subframe configuration may be predefined to use a specific special subframe configuration in the DS subframe or a specific configuration index may be indicated to the UE by higher layer signaling. Additionally, the special subframe configuration of the DS subframe may be included in a UL-DL reconfiguration message. Meanwhile, since requiring the DS subframe may mean increase of UL traffic, the special subframe configuration in the DS subframe may be predefined as one of configurations 5 to 9 or may be signaled, in order to secure more UpPTSs. Alternatively, in consideration of a transmission (Tx)/reception (Rx) switching time, a special subframe type on an SIB determined in a network may be predefined to be used in the DS subframe and whether to conform to the special subframe configuration of the SIB may be signaled.

In the above description, since the EPDCCH cannot be transmitted in special subframe configurations 0 and 5, the AUE may assume the SD subframe as a normal subframe in the case of special subframe configurations 0 and 5.

Apparatus Construction According to Embodiment of the Present Invention

Figure 11:
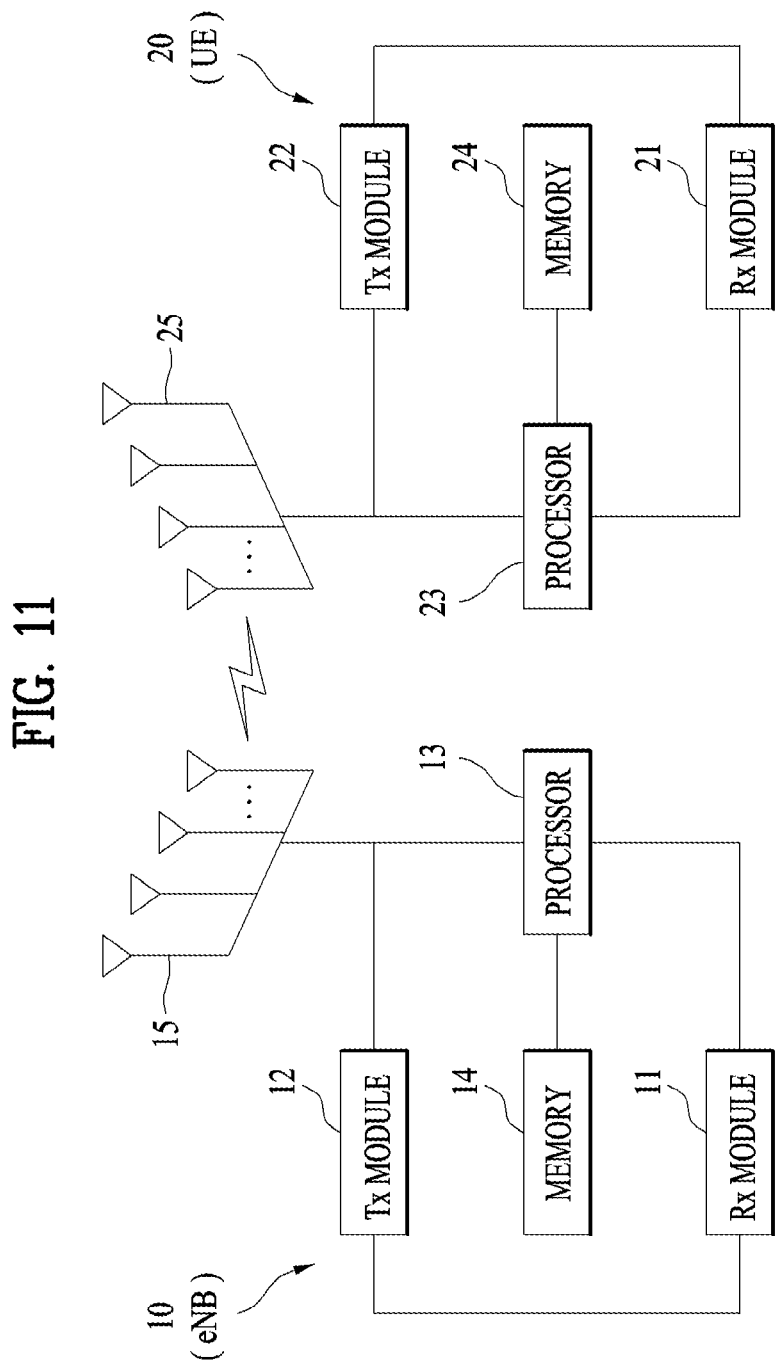
FIG. 11 is a diagram illustrating the construction of transmission and reception apparatuses.

FIG. 11 is a diagram illustrating an apparatus configuration of a transmission point and a UE according to an embodiment of the present invention.

Referring to FIG. 11, a transmission point 10 according to the present invention may include an Rx module 11, a Tx module 12, a processor 13, a memory 14, and a plurality of antennas 15. The plurality of antennas 15 indicates a transmission point supporting MIMO transmission and reception. The Rx module 11 may receive a variety of signals, data, and information on UL from the UE. The Tx module 12 may transmit a variety of signals, data, and information on DL to the UE. The processor 13 may control overall operation of the transmission point 10.

The processor 13 of the transmission point 10 according to an embodiment of the present invention may process operations needed in the above-mentioned embodiments.

The processor 13 of the transmission point 10 processes information received at the transmission point 10 and transmission information to be externally transmitted. The memory 14 may store the processed information for a predetermined time. The memory 14 may be replaced with a component such as a buffer (not shown).

Referring to FIG. 11, a UE 20 may include an Rx module 21, a Tx module 22, a processor 23, a memory 24, and a plurality of antennas 25. The plurality of antennas 25 indicates a UE supporting MIMO transmission and reception. The Rx module 21 may receive DL signals, data, and information from the eNB. The Tx module 22 may transmit UL signals, data, and information to the eNB. The processor 23 may control overall operation of the UE 20.

The processor 23 of the UE 20 according to an embodiment of the present invention may process operations needed in the above-mentioned embodiments.

The processor 23 of the UE 20 processes information received at the UE 20 and transmission information to be externally transmitted. The memory 24 may store the processed information for a predetermined time. The memory 24 may be replaced with a component such as a buffer (not shown).

The detailed construction of the transmission point and the UE may be implemented such that the various embodiments of the present invention are independently performed or two or more embodiments of the present invention are simultaneously performed. Redundant matters will not be described herein for clarity.

The description of the transmission point 10 shown in FIG. 11 may be identically applied to a relay node acting as a DL transmission entity or UL reception entity and the description of the UE 20 may be identically applied to the relay node acting as a DL reception entity or a UL transmission entity.

The above-described embodiments may be implemented by various means, for example, by hardware, firmware, software, or a combination thereof.

In a hardware configuration, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the exemplary embodiments of the present invention is given to enable those skilled in the art to realize and implement the present invention. While the present invention has been described with reference to the exemplary embodiments of the present invention, those skilled in the art will appreciate that many modifications and changes can be made to the present invention without departing from the scope of the present invention. For example, the constructions of the above-described embodiments of the present invention may be used in combination. Therefore, the present invention is not intended to be limited to the embodiments disclosed herein but is to give a broadest range matching the principles and new features disclosed herein.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention. The present invention is not intended to limit the embodiments disclosed herein but is to give the broadest range matching the principles and new features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to a variety of mobile communication systems

The invention claimed is:

1. A method for receiving a downlink signal by a user equipment in a wireless communication system, the method comprising:
receiving information indicating that usage of a first subframe, which is a special subframe, is changed to be used as a downlink subframe; and
decoding a control channel using a first radio network temporary identifier (RNTI) and a second RNTI in the usage changed subframe,
wherein, if the control channel has successfully been decoded using the first RNTI, the user equipment assumes that data is present in a downlink pilot time slot (DwPTS) among resource regions indicated by the control channel, and
wherein, if the control channel has successfully been decoded using the second RNTI, the user equipment assumes that the data is present even in a guard period (GP) and an uplink pilot time slot (UpPTS) region among the resource regions indicated by the control channel.

2. The method according to claim 1, wherein, if the control channel has successfully been decoded using both the first RNTI and the second RNTI and if the resource regions indicated by the control channel related to the first RNTI and the resource regions indicated by the control channel related to the second RNTI overlap, the user equipment assumes that a physical downlink shared channel (PDSCH) is present only in a GP and an UpPTS of the overlapping resource regions.

3. The method according to claim 2, wherein the user equipment assumes a demodulation reference signal (DMRS) pattern related to the special subframe upon receiving a DMRS in the overlapping resource regions.

4. The method according to claim 1, wherein, if the user equipment is a user equipment recognizing the usage change, the user equipment receives a physical downlink shared channel (PDSCH) in a GP and an UpPTS of the usage changed subframe.

5. The method according to claim 1, wherein a user equipment recognizing the usage change and a user equipment incapable of recognizing the usage change in the usage changed subframe receive a physical downlink shared channel (PDSCH) in different layers.

6. The method according to claim 1, wherein, if the information is received through an enhanced physical downlink control channel (EPDCCH), the information indicates that the usage change takes priority over an uplink-downlink configuration of system information in receiving the EPDCCH.

7. The method according to claim 1, wherein, if the information is received through an enhanced physical downlink control channel (EPDCCH), the user equipment assumes that the first subframe is the special subframe upon blind decoding the EPDCCH and decoding a demodulation reference signal (DMRS) related to the EPDCCH.

8. The method according to claim 1, wherein a physical downlink shared channel (PDSCH) for a user equipment recognizing the usage change is transmitted in a GP and an UpPTS in a physical resource block (PRB) pair in which an enhanced physical downlink control channel (EPDCCH) is transmitted.

9. The method according to claim 1, wherein, if the information is received through an enhanced physical downlink control channel (EPDCCH), the user equipment assumes that the first subframe is the downlink subframe upon blind decoding the EPDCCH and assumes that the first subframe is the special subframe upon decoding a demodulation reference signal (DMRS) related to the EPDCCH.

10. The method according to claim 8, wherein the user equipment assumes that the first subframe is the special subframe in calculating the number of enhanced control channel elements (ECCEs) per PRB pair upon blind decoding the EPDCCH.

11. The method according to claim 1, wherein the first RNTI is one of a random access RNTI (RA-RNTI), a paging RNTI (P-RNTI), and a system information RNTI (SI-RNTI).

12. The method according to claim 11, wherein the second RNTI is an RNTI capable of being used only by a user equipment recognizing the usage change.

13. A user equipment in a wireless communication system, the user equipment comprising:
- a reception module; and
- a processor,
- wherein the processor is configured to receive, through the reception module, information indicating that usage of a first subframe, which is a special subframe, is changed to be used as a downlink subframe, and decode a control channel using a first radio network temporary identifier (RNTI) and a second RNTI in the usage changed subframe, and
- wherein, if the control channel has successfully been decoded using the first RNTI, the processor assumes that data is present in a downlink pilot time slot (DwPTS) among resource regions indicated by the control channel, and
- wherein, if the control channel has successfully been decoded using the second RNTI, the processor assumes that the data is present even in a guard period (GP) and an uplink pilot time slot (UpPTS) region among the resource regions indicated by the control channel.

* * * * *